(12) United States Patent
Sandberg et al.

(10) Patent No.: US 7,725,719 B2
(45) Date of Patent: May 25, 2010

(54) METHOD AND SYSTEM FOR GENERATING CIPHERTEXT AND MESSAGE AUTHENTICATION CODES UTILIZING SHARED HARDWARE

(75) Inventors: Melanie J. Sandberg, Tucson, AZ (US); Scott J. Schaffer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 11/268,981

(22) Filed: Nov. 8, 2005

(65) Prior Publication Data

US 2007/0106896 A1    May 10, 2007

(51) Int. Cl.
*H04L 9/00* (2006.01)
(52) U.S. Cl. ...................................... 713/170
(58) Field of Classification Search .................. 713/170, 713/176, 180, 181; 380/28, 30, 259
See application file for complete search history.

(56) References Cited

U.S. PATENT DOCUMENTS

| | | | |
|---|---|---|---|
| 3,958,081 A | 5/1976 | Ehrsam | |
| 4,229,818 A | 10/1980 | Matyas | |
| 4,274,085 A | 6/1981 | Marino, Jr. | |
| 4,731,843 A | 3/1988 | Holmquist | |
| 5,631,960 A | 5/1997 | Likens | |
| 5,835,599 A | 11/1998 | Buer | |
| 6,028,933 A | 2/2000 | Heer et al. | |
| 6,324,286 B1 | 11/2001 | Lai | |
| 6,360,321 B1 | 3/2002 | Gressel | |
| 6,504,930 B2 | 1/2003 | Enari | |
| 6,760,439 B1 | 7/2004 | Windirsch | |
| 6,765,484 B2 | 7/2004 | Eagleson | |
| 2002/0071552 A1 | 6/2002 | Rogaway | |
| 2004/0250095 A1* | 12/2004 | Feldman | 713/191 |
| 2008/0240424 A1* | 10/2008 | Park | 380/28 |

FOREIGN PATENT DOCUMENTS

EP    1118941 A1    1/2003

\* cited by examiner

*Primary Examiner*—Beemnet W Dada
(74) *Attorney, Agent, or Firm*—Kunzler Needham Massey & Thorpe

(57) ABSTRACT

A method and system for generating ciphertext and message authentication codes utilizing shared hardware are disclosed. According to one embodiment, a method is provided of generating ciphertext message data and message authentication codes utilizing shared authenticated encryption unit hardware. In the described embodiment, plaintext message data is received at an authenticated encryption unit which comprises first and second authenticated encryption hardware modules. Thereafter, a first message authentication code (MAC) associated with a first authenticated encryption mode and a second MAC associated with a second authenticated encryption mode are generated. More specifically, the first MAC is generated utilizing the plaintext message data and first authenticated encryption hardware module and ciphertext message data and the second MAC are generated utilizing the plaintext message data and second authenticated encryption hardware module.

28 Claims, 5 Drawing Sheets

METHOD AND SYSTEM FOR GENERATING CIPHERTEXT AND MESSAGE AUTHENTICATION CODES UTILIZING SHARED HARDWARE

BACKGROUND

1. Technical Field

Embodiments of the present invention relate generally to message transmission and authenticated encryption and more particularly to a method and system for generating ciphertext and message authentication codes utilizing shared hardware.

2. Description of the Related Art

An authenticated encryption (or authenticated encryption and associated data) system is one that employs various hardware and software elements, cryptographic keys, algorithms, and/or techniques to simultaneously protect the confidentiality and the authenticity or "integrity" of communications. More specifically, authenticated encryption attempts to make it computationally infeasible for a party to fraudulently represent themselves as an authentic message source by encoding a message, to fraudulently decode messages received from such a source, or to otherwise gain information about the manner in which message data is encrypted, decrypted, or authenticated. While a number of conventional authenticated encryption (AE) systems or modes are provided utilizing symmetric block ciphers (e.g., Electronic Code Book, Cipher Block Chaining, Cipher Feedback, Output Feedback, Counter Mode, or the like), AE functionality may be provided generally by combining any encryption technique (e.g., symmetric or asymmetric) and authentication technique via the generation of a message authentication code (MAC) or "tag" under appropriate constraints. Where authenticated encryption systems implement encoding (or decoding) via the encryption (or decryption) of message data and MAC generation (or verification) such operations may be performed in any order or substantially simultaneously.

Although the goals of message data confidentiality and authenticity or integrity have long been studied, only relatively recently have a number of systems been developed due to the complexity of implementing both operations in a single application. Exemplary authenticated encryption systems or modes include Counter with CBC-MAC (CCM), One-Key CBC-MAC (OMAC), Cipher-State (CS), Carter Wegman with Counter (CWC), Encrypt then Authenticate then Translate Mode (EAX), Galois/Counter Mode (GCM), Integrity Aware Cipher Block Chaining (IACBC), Integrity Aware Parallelizable Mode (IAPM), Offset Codebook (OCB), Propagating Cipher Feedback (PCFB), and eXtended Cipher Block Chaining Encryption (XCBC).

FIG. 3 illustrates a block diagram representation of a first authenticated encryption mode authenticated encryption unit according to the prior art. More specifically, FIG. 3 depicts a block diagram of an authenticated encryption unit configured to perform GCM authenticated encryption. GCM or "Galois/Counter Mode" is a block cipher mode of operation that uses universal hashing over a binary Galois field to provide authenticated encryption. GCM uses mechanisms that are supported by a well-understood theoretical foundation, and its security follows from a single reasonable assumption about the security of the block cipher.

GCM has two operations, authenticated encryption and authenticated decryption. For purposes of illustration herein, only authenticated encryption functionality will be described in detail. In the prior art embodiment which will be described with respect to FIG. 3, GCM authenticated encryption has three inputs, each of which is a bit string including, a secret key "K" (not shown), whose length is appropriate for the underlying block cipher, an initialization vector "IV", that can have any number of bits between 1 and 264, and plaintext message data. For a fixed value of the key (K), each initialization vector value must be distinct, but need not have equal lengths. Additional authenticated data may also be provided which is authenticated although not encrypted.

Utilizing the described inputs, two outputs are generated, ciphertext message data whose length is exactly that of the plaintext message data, and a message authentication code "MAC", whose length can be any value between 64 and 128. Each input and output in the illustrated prior art embodiment is embodied within a data bit string. The primary purpose of the initialization vector is to server as a nonce, that is, to be distinct for each invocation of the encryption operation for a fixed key.

In operation, the initialization vector "IV" is applied to an increment function hardware module 302 which outputs successive counter values that are applied to a block cipher encryption hardware module 304. In the prior art embodiment of FIG. 3, block cipher encryption hardware module 304 implements an Advanced Encryption Standard (AES) block cipher. A multiplexer 306 or other switching element is then utilized to output data specifying the first encrypted IV/counter for use in generating a MAC value as indicated by dashed line 308. Multiplexer 306 is then switched or actuated such that data specifying subsequent encrypted IV/counter values are combined, via a logical exclusive OR operation, using XOR hardware module 310 with plaintext message data to generate ciphertext message data as shown.

The described ciphertext message data is applied to another XOR hardware module 312 to be logically combined with feedback data generated by Galois Field (GF) multiplier hardware module 314 (e.g., initially GF multiplied additional authenticated data or other seed or initialization data) and the resultant logically combined data is applied to GF multiplier hardware module 314 as shown. Following GF multiplication, the generated output of GF multiplier hardware module 314 is fed back to XOR hardware module 312 and simultaneously applied to a final XOR hardware module 316. The applied GF multiplier hardware module output is logically combined using XOR hardware module 316 with the previously-described first encrypted IV/counter data to generate a MAC as shown.

FIG. 4 illustrates a block diagram representation of a second authenticated encryption mode authenticated encryption unit according to the prior art. More specifically, FIG. 4 depicts a block diagram of an authenticated encryption unit configured to perform Cipher-Block Chaining (CBC)-MAC (CCM) authenticated encryption. CCM mode combines counter mode encryption with a CBC-MAC mode of authentication. Utilizing CCM, a single encryption key (not shown) can be used for both encryption and authentication, provided that the counter values used in the encryption do not collide with the (pre-)initialization vector used in authentication. CCM is a generic authenticate-and-encrypt block cipher mode. Traditionally, CCM is defined for use with 128-bit block ciphers such as AES.

CCM has two operations, authenticated encryption and authenticated decryption. For purposes of illustration herein, only authenticated encryption functionality will be described in detail. In the prior art embodiment of FIG. 4, CCM authenticated encryption utilizes three bit string inputs including a secret key "K" (not shown), a nonce (e.g., an initialization vector "IV"), and plaintext message data. As described herein with respect to GCM, additional authenticated data may also be provided for authentication without encryption. Utilizing the described inputs, two bit string outputs are generated, a ciphertext message data whose length is exactly that of the plaintext message data and a message authentication code "MAC".

In operation, the initialization vector "IV" is applied to an increment function hardware module 302 which outputs successive counter values that are applied to a block cipher (e.g., AES) encryption hardware module 404. A multiplexer 406 or other switching element is then utilized to output data specifying the first encrypted IV/counter for use in generating a MAC value as indicated by dashed line 408. Multiplexer 406 is then switched or actuated such that data specifying subsequent encrypted IV/counter values are combined, via a logical exclusive OR operation, using XOR hardware module 410 with plaintext message data to generate ciphertext message data as shown.

The described plaintext message data is also simultaneously applied to another XOR hardware module 412 to be logically combined with feedback data generated by another (e.g., AES) block cipher encryption hardware module 414 (e.g., encrypted additional authenticated data or other seed or initialization data) and the resultant logically combined data is applied to block cipher encryption hardware module 414 as shown. Following encryption, the generated output of block cipher encryption hardware module 414 is fed back to XOR hardware module 412 and simultaneously applied to a final XOR hardware module 416. The applied block cipher encryption hardware module output is logically combined using XOR hardware module 416 with the previously-described first encrypted IV/counter data to generate a MAC as shown.

While any of the described AE techniques or modes may be implemented in software or a combination of software and hardware, authenticated encryption is typically implemented solely in hardware such that inter or intra-system buffering of message data is not required.

Because of the monetary cost of application or mode-specific AE solutions, conventional systems typically implement a single authenticated encryption mode of operation. Consequently, such conventional AE systems suffer from number of drawbacks. More specifically, any change or supplement in the AE mode of operation to be performed (e.g., when an existing mode of operation is compromised from an encryption or authentication standpoint, when a particular user or implementation requires a different mode of authenticated encryption operation than that already provided, when greater flexibility or centralization of a system including authenticated encryption functionality is desired, or the like) requires the provision of additional, specifically configured hardware. Such additional hardware may be cost or space-prohibitive in some systems.

SUMMARY

A method and system for generating ciphertext and message authentication codes utilizing shared hardware is provided. According to one embodiment of the present invention a method is provided of generating ciphertext message data and message authentication codes utilizing shared authenticated encryption unit hardware. In the described embodiment, plaintext message data is received at an authenticated encryption unit which comprises first and second authenticated encryption hardware modules. Thereafter, a first message authentication code (MAC) associated with a first authenticated encryption mode and a second MAC associated with a second authenticated encryption mode are generated. More specifically, the first MAC is generated utilizing the plaintext message data and first authenticated encryption hardware module and ciphertext message data and the second MAC are generated utilizing the plaintext message data and second authenticated encryption hardware module.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same or similar reference symbols within the accompanying drawings indicates similar or identical items.

DETAILED DESCRIPTION OF AN ILLUSTRATIVE EMBODIMENT

Figure 1:
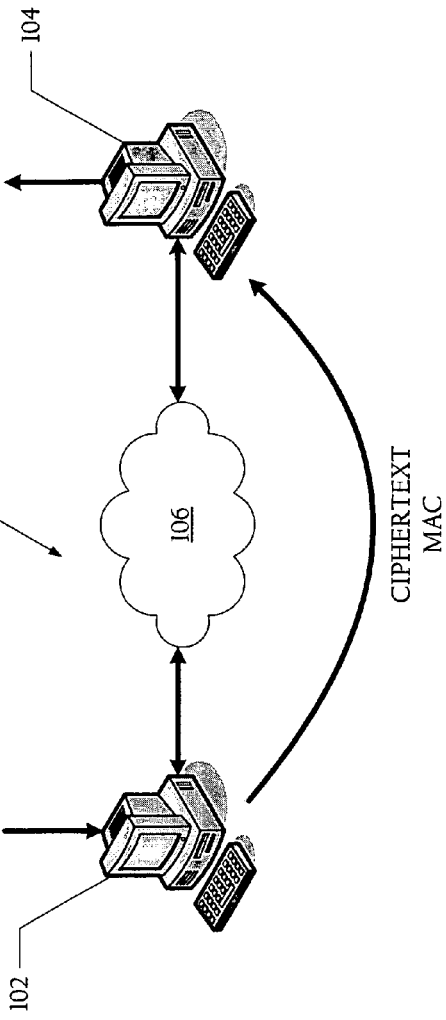
FIG. 1 illustrates a communications network according to an embodiment of the present invention.

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a method and system for generating ciphertext and message authentication codes utilizing shared hardware. A message authentication code (MAC), alternatively known as a tag, authenticated encryption tag, cryptographic checksum, integrity check value, modification detection code, or message integrity code, in the present description is intended to indicate data (e.g., a mathematical value) associated with a message in an authenticated encryption system which is capable of being used to validate the integrity (i.e., authenticate) data of the message at a later time. In other words, to determine whether or not data contained in the message has not been modified subsequent to the generation of the MAC. In this manner MACs are similar to hash functions or digital signatures in some respects and are typically used in data transmission and/or data storage systems including elements such as the TotalStorage® 3592 Tape Drive Model J1A and/or Tape Controller Model J70 provided by International Business Machines Corporation of Armonk, N.Y.

In one or more embodiments of the present invention, multiple MAC types and ciphertext are provided utilizing a shared hardware implementation. Utilizing such implementation embodiments, two or more authenticated encryption modes of operations may be provided using shared hardware to reduce or eliminate the number of hardware components or modules needed as compared to conventional systems including separate authenticated encryption units for each mode of operation. To enable the shared use of authenticated encryption hardware modules, one embodiment of the present invention illustrated herein implements Counter Mode (CTR) block cipher encryption with MACs being provided using Counter with CBC-MAC (CCM) and Galois/Counter Mode (GCM) modes of operation. In other embodiments of the present invention however, any of a number of compatible authenticated encryption modes of operations may be implemented in combination utilizing any of a number of encryption techniques (e.g., symmetric or asymmetric/public key, block or stream ciphers, codes, or the like).

In the described invention embodiment, including dual CCM and GCM modes of operation, CTR encryption utilizes a nonce (e.g., an initialization vector value which is incremented using a counter or incrementer) and an Advanced Encryption Standard (AES) Federal Information Processing Standards Publication 197 (FIPS-197) macro or module. As will be explained in greater detail herein, CCM authentication also uses a form of Cipher Block Chaining and consequently utilizes an AES FIPS-197 macro for the production of a MAC, thereby enabling a single pipelined hardware module to be shared for both MAC and ciphertext production. By using a pipelined authenticated encryption hardware module as described, multiple MACs and ciphertext may not only be generated, but may be generated substantially simultaneously with one another. In the described embodiment, GCM authentication utilizes a separate Galois Field multiplier, also described in greater detail herein. Accordingly, using one or more embodiments of the present invention multiple MACs and authenticated encryption operational modes may be provided substantially simultaneously in a shared hardware implementation using minimal additional hardware beyond that conventionally used for a single AE mode.

In variations of the described embodiment of the present invention, authenticated encryption mode selection data (e.g., one or more selection indicators, bits, tags, or the like) is received and utilized to select the manner in which ciphertext and MACs are generated. For example, two or more MACs may be generated utilizing one or more systems or methods described herein and such authenticated encryption mode selection data may be used to identify which of the two or more possible MACs (or ciphertext message data outputs) are to be provided as output of an associated authenticated encryption unit. In another embodiment, the generation of multiple MACs and/or the performance of multiple AE modes of operations may be selectably performed using such authenticated encryption mode selection data. For example, authenticated encryption mode selection data may be used to determine whether selected shared authenticated encryption hardware modules are activated and/or if required input data (e.g., plaintext, ciphertext, nonce data, or the like) is applied at required authenticated encryption hardware module inputs.

In one embodiment of the present invention, a first authenticated encryption mode selection indicator (e.g., a bit) indicator is utilized to select whether two or more authenticated encryption operational modes are to be performed substantially simultaneously (e.g., via interleaving) and a second authenticated encryption mode selection indicator (e.g., bit) is utilized to identify either the authenticated encryption operational mode to be performed or alternatively which authenticated encryption data (e.g., MACs) is to be provided as an output. In another embodiment, two or more MACs are generated substantially simultaneously with one another which are then utilized to generate at least one other synthesized MAC. For example, in various embodiments two or more MACs may be concatenated, interleaved, or otherwise combined.

FIG. 1 illustrates a communications network according to an embodiment of the present invention. Communications network 100 of the illustrated embodiment includes a message encoding data processing system 102 configured to perform one or more of the methods or comprising one or more of the systems, elements, or modules described herein and a corresponding message decoding data processing system 104 communicatively coupled via a network communications medium 106 or link (e.g., a local or wide area network). In the depicted embodiment of FIG. 1, data including plaintext, an initialization vector or other nonce or nonce seed, and one or more authenticated encryption mode selection indicators are provided to or generated by message encoding data processing system 102. The described data is in turn utilized by message encoding data processing system 102 to generate data specifying ciphertext and at least one MAC according to one or more methods of the present invention or utilizing one or more systems, elements, units, or modules described herein.

Once generated, the described ciphertext and MAC(s)-specifying data is communicated via communications medium 106 to message decoding data processing system 104 as shown utilizing corresponding methods, systems, elements, units, or modules. While represented as conventional personal computers, data processing systems such as message encoding and decoding data processing systems 102 and 104 may comprise any of a number of hardware devices and/or software components in combination such as exemplary data processing system 200 depicted in FIG. 2. In one embodiment of the present invention, each of encoding data processing system 102 and decoding data processing system 104 may comprise one or more storage devices or elements (e.g., disk drives, tape drives, RAID array subsystems, robotic tape libraries, filers, file servers) and/or associated control devices, elements or adapters.

Figure 2:
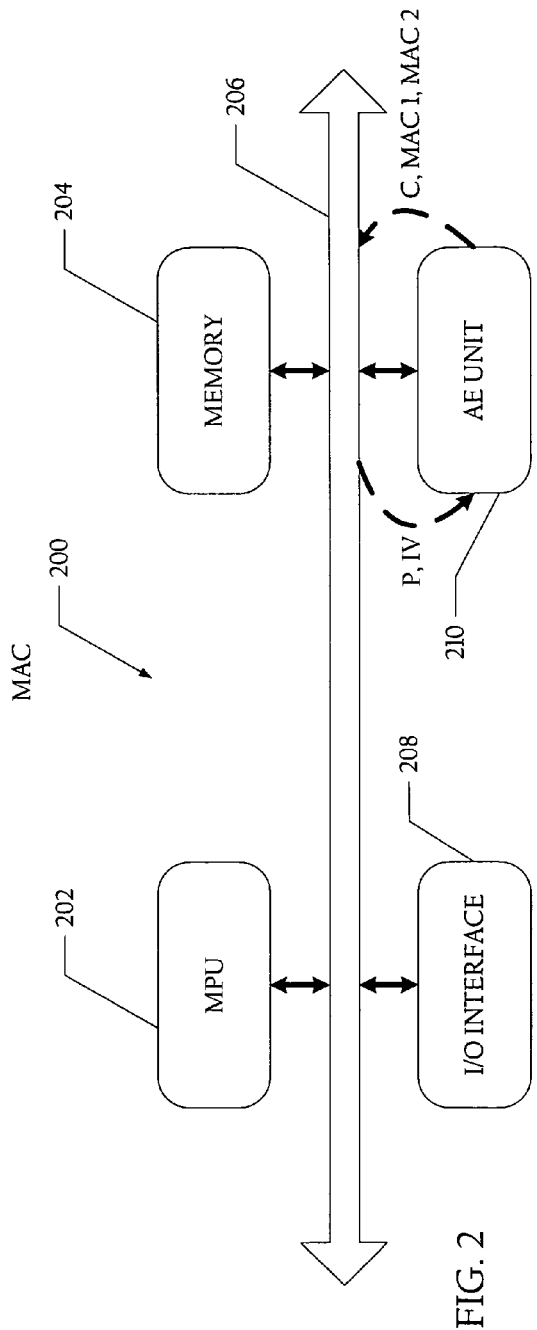
FIG. 2 illustrates a data processing system configured to perform authenticated encryption according to an embodiment of the present invention.
Figure 3:
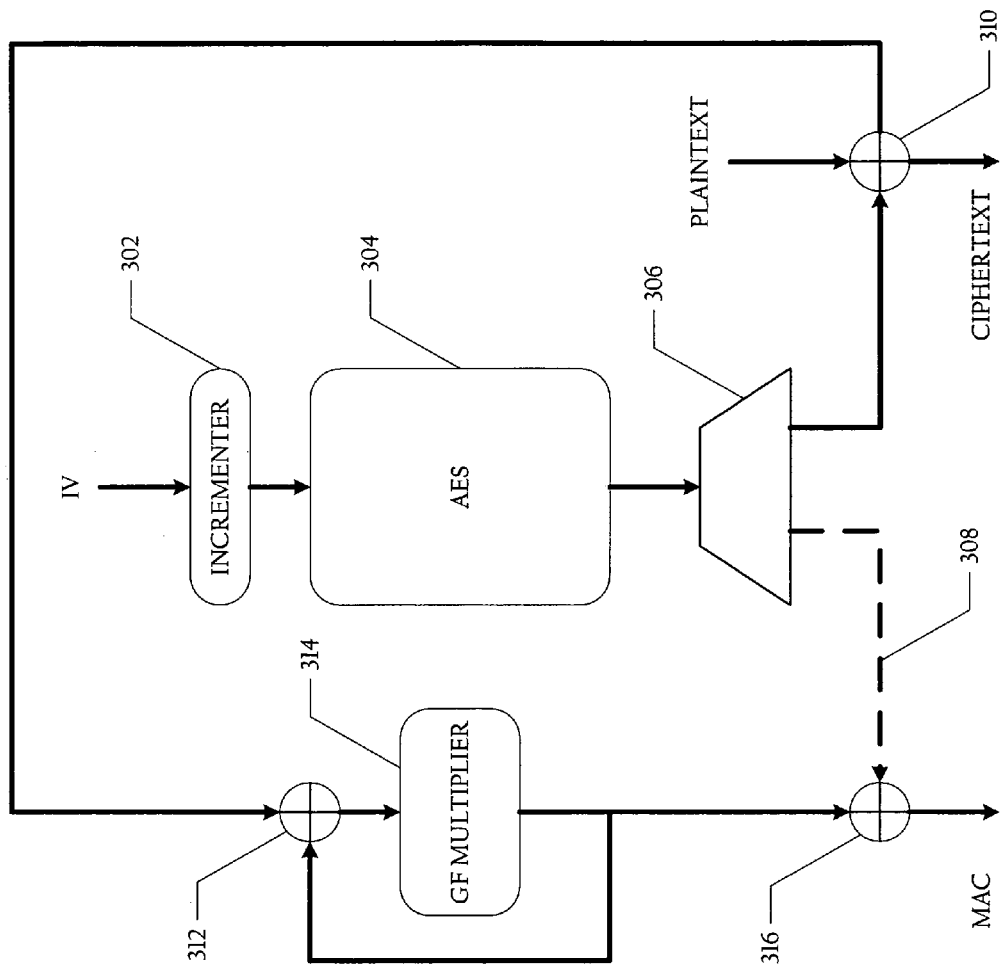
FIG. 3 illustrates a block diagram representation of a first authenticated encryption mode authenticated encryption unit according to the prior art.

FIG. 2 illustrates a data processing system configured to perform authenticated encryption according to an embodiment of the present invention. While a particular number and arrangement of elements have been illustrated with respect to data processing system 200 of FIG. 2, it should be appreciated that embodiments of the present invention are not limited to data processing systems having any particular number, type, or arrangement of components and so many encompass a wide variety of data processing system types, architectures, and form factors (e.g., network elements or nodes, personal computers, workstations, servers, or the like). Data processing system 200 of the illustrated embodiment includes a processor 202 coupled to a memory 204 utilizing a bus 206 or other communication medium. Memory 204 may comprise any of a number of system memory-type storage elements such as random access memory (RAM), read-only memory (ROM), flash memory, and cache.

Data processing system 200 of the illustrated embodiment further comprises an input/output (I/O) interface 208 coupled to bus 206 to communicatively couple one or more I/O devices (not shown) to data processing system 200. Exemplary I/O devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

In the embodiment of FIG. 2, data processing system 200 further includes an authenticated encryption unit 210 as shown. While AE encryption unit 210 has been depicted as a single separate hardware element, the particular number and arrangement of hardware modules or components comprising AE encryption unit 210 may be varied in alternative embodiments of the present invention. Similarly, while a general purpose processor (e.g., processor 202) and memory have been shown for purposes of illustration, in variant embodiments of the present invention substitute elements may be utilized. For example, a data processing system as described herein may comprise one or more special purpose or application specific processors or other processing element (e.g., programmable logic devices). Moreover, processor 202 or any of the described substitute processing elements may or may necessarily include separate memory elements such as memory 204, alternatively including integrated storage (e.g., a register file, cache or the like).

In the illustrated embodiment of FIG. 2, AE unit 210 comprises a dedicated hardware device or processing element configured to perform authenticated encryption operations on associated message data. In one embodiment, the internal structure of AE unit 210 comprises a number of hardware modules (not illustrated) utilized to perform various component AE operations. In operation, AE unit 210 receives input data such as plaintext "P" and an initialization vector "IV" and in turn generates and provides output data including, for example, ciphertext "C", a first MAC "MAC1", and a second MAC "MAC2" as shown in FIG. 2.

Embodiments of the present invention may include software, information processing hardware, and various processing operations further described herein. The features and process operations of various invention embodiments may be embodied in executable instructions embodied within a machine-readable medium such as memory 204, a storage device, a communication device or medium, or the like. A machine-readable medium may include any mechanism that provides (i.e., stores and/or transmits) data in a form readable by a machine (e.g., data processing system 200). For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as processor 202, programmed with the instructions, to perform operations, methods or processes of the present invention. Alternatively, the features or operations of the present invention may be performed by specific hardware components that contain hardwired logic for performing such operations, or by any combination of programmed data processing components and custom hardware components.

Figure 4:
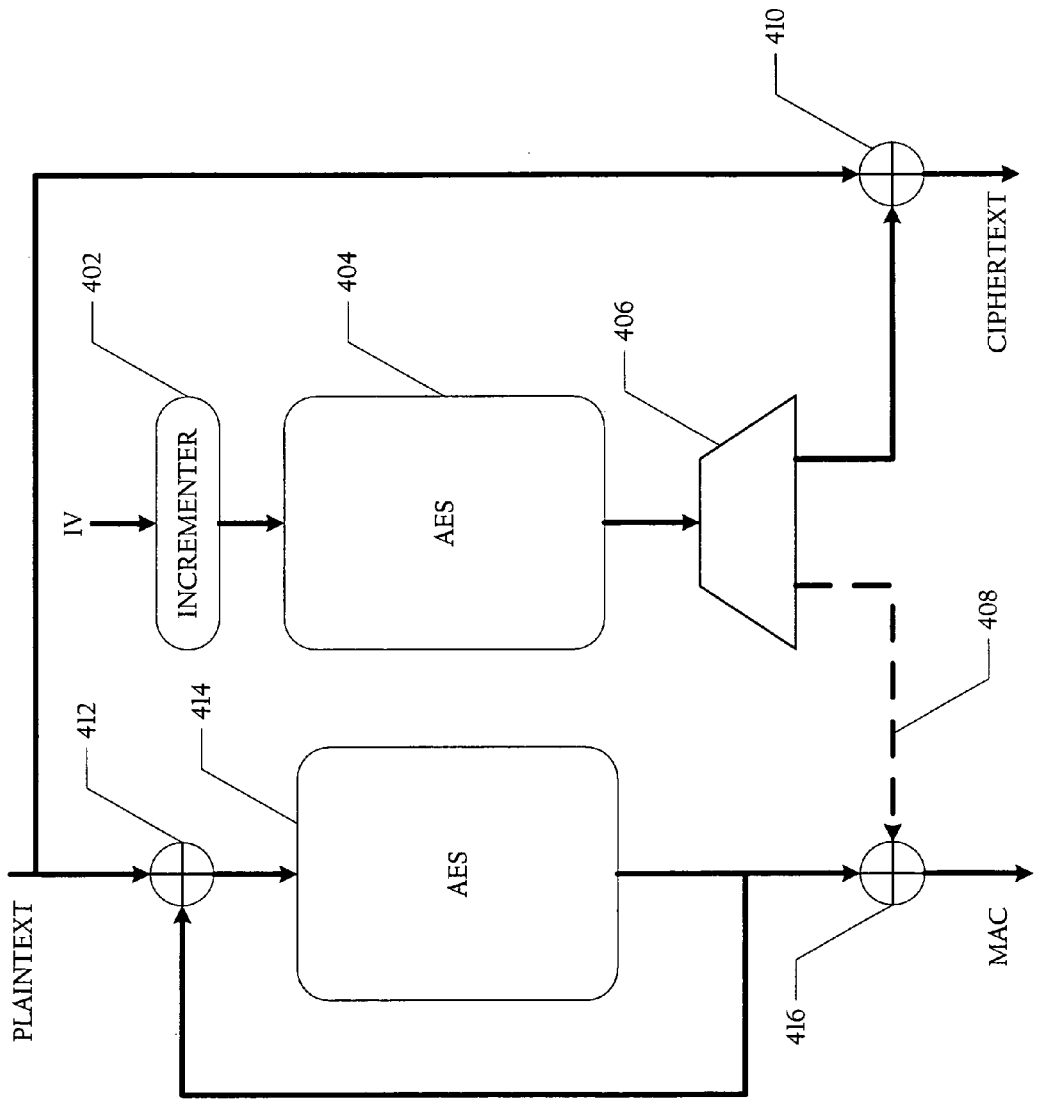
FIG. 4 illustrates a block diagram representation of a second authenticated encryption mode authenticated encryption unit according to the prior art.
Figure 5:
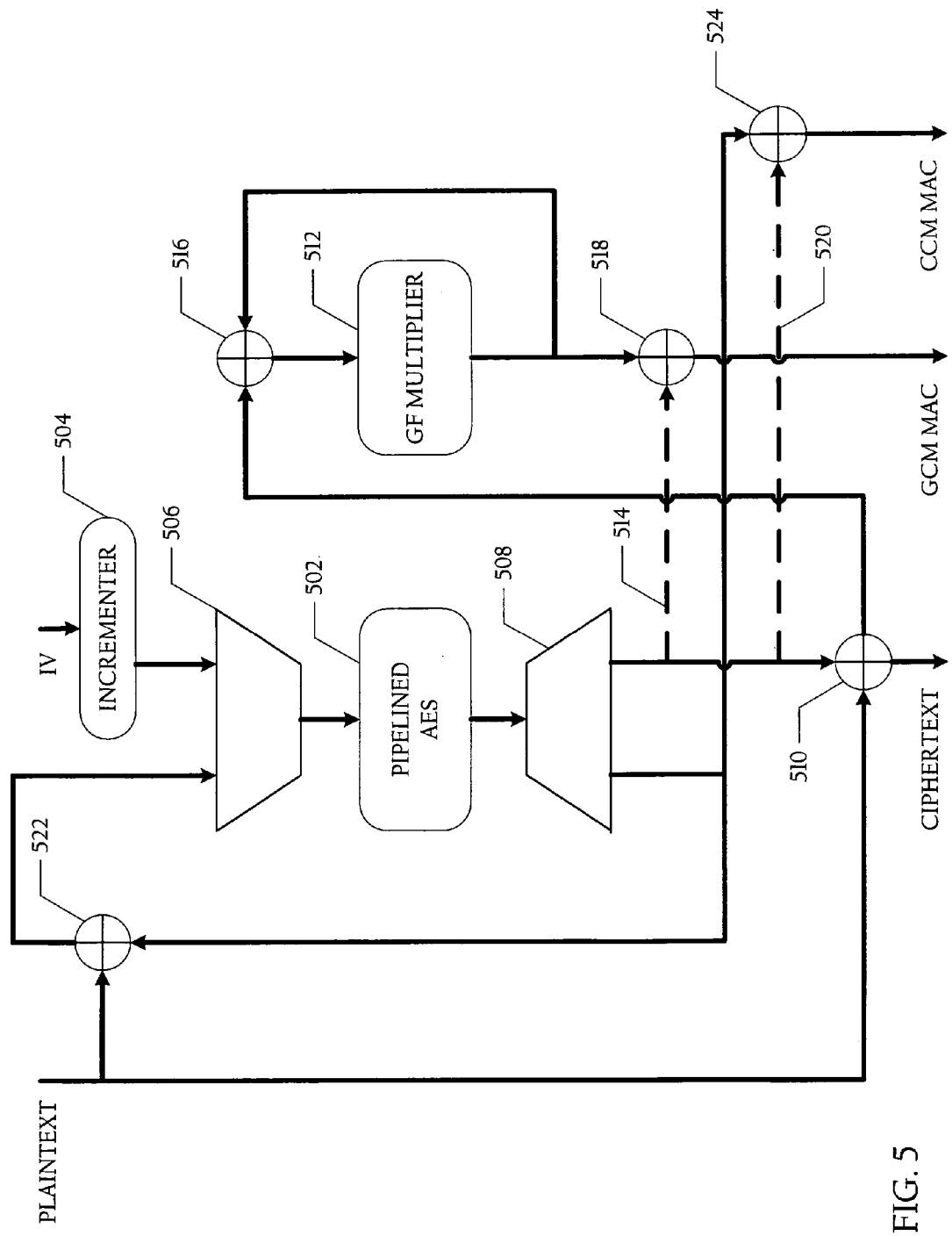
FIG. 5 illustrates a block diagram representation of a multi-mode authenticated encryption unit according to an embodiment of the present invention.

In the illustrated embodiment of FIG. 4, two separate non-pipelined block cipher encryption hardware (e.g., AES) modules are utilized such that ciphertext message data and a corresponding MAC may be generated substantially simultaneously with one another. As depicted in FIG. 5, embodiments of the present invention utilize a single pipelined encryption hardware module to reduce authenticated encryption unit complexity and cost via reduction in the number of component hardware modules used without any perceivable different in the speed with which output data is produced.

FIG. 5 illustrates a block diagram representation of a multi-mode authenticated encryption unit according to an embodiment of the present invention. More specifically, FIG. 5 depicts a block diagram of an authentication unit configured to substantially simultaneously perform Cipher-Block Chaining (CBC)-MAC (CCM) authenticated encryption and Galois/Counter Mode (GCM) authenticated encryption utilizing one or more shared hardware modules. As previously described with respect to conventional CCM and GCM authenticated encryption, the depicted AE unit may be utilized to provide both authenticated encryption and authenticated decryption operations. To avoid unnecessarily obscuring or complicating the selected invention embodiments depicted herein however, only authenticated encryption functionality and corresponding system elements (e.g., hardware modules) will be described in detail.

In the illustrated embodiment of FIG. 5, the depicted authenticated encryption unit has three inputs including a secret key "K" (not shown), whose length is appropriate for the underlying block cipher, an initialization vector "IV", and plaintext message data. For a fixed value of the key (K), each initialization vector value of the described embodiment is distinct, but need not have equal lengths. Additional authenticated data (not shown) may also be provided which is authenticated although not encrypted.

Utilizing the described inputs, three outputs are generated, ciphertext message data whose length is equivalent to that of the plaintext message data, a first (e.g., GCM) message authentication code "GCM MAC", and a second (e.g., CCM) message authentication code "CCM MAC". The described inputs and outputs are defined in terms of bit strings but in alternative embodiments may comprise data of any of a number of formats or sizes. The primary purpose of the initialization vector is to server as a nonce, that is, to be distinct for each invocation of the encryption operation for a fixed key. In one or more embodiments of the present invention the initialization vector may be generated randomly.

While in the embodiment of FIG. 5 only two authenticated encryption outputs are depicted, embodiments of the present invention are scalable and a greater number of AE outputs are contemplated by such embodiments. Similarly, while all AE outputs are provided substantially simultaneously by each operation of the depicted authenticated encryption unit of FIG. 5, in alternative embodiments of the present invention selection elements or logic may be included which may be utilized to selectably control one or both of the inputs accepted (thereby controlling the generation or production of selected ciphertext or MAC outputs) and the outputs provided.

In operation, ciphertext message data is generated utilizing the depicted authenticated encryption unit via counter mode encryption within the depicted pipelined block cipher encryption (e.g., AES) hardware module 502. The encryption of the described counter values and other data more fully described herein is interleaved using pipelined block cipher encryption hardware module 502. More specifically, an initialization vector "IV" is applied to an increment function hardware module 504 which outputs successive counter values that are selectably applied to pipelined block cipher encryption hardware module 502 via a multiplexer 506 or other selection or switching means.

Thus, incrementing counter values are provided to a portion of the operational cycles available within pipelined block cipher encryption hardware module 502. Once encrypted, the described counter values are selectably applied via another multiplexer 508 or similar selection means, along with corresponding portions of plaintext-specifying data to an XOR hardware module 510 and logically combined to generate ciphertext message data as shown. While specific encryption techniques, modes of operation, and hardware modules have been illustrated and described herein, in alternative embodiments any of a number of such elements or techniques may be implemented. In the embodiment of FIG. 5, the remaining operational cycles of pipelined block cipher encryption hardware module 502 are utilized, in conjunction with other supplemental hardware modules where necessary, to generate multiple authenticated encryption MACs as will be described more fully herein.

To generate data specifying a GCM MAC, a separate Galois Field (GF) multiplier hardware module 512 is utilized in combination with the ciphertext message data generated by the previously-described portion of operational cycles of pipelined block cipher encryption hardware module 502. More specifically, multiplexer 508 is utilized to selectably output data specifying the first encrypted IV/counter as indicated by dashed line 514. While multiplexer 508 has been depicted as a single 2-to-1 type switching element for purposes of illustration herein, multiplexer 508 may comprise a 3-to-1 multiplexer or two 2-to-1 multiplexers coupled together in a cascaded manner in alternative embodiments of the present invention.

However arranged, multiplexer 508 is switched or actuated such that encrypted IV/counter values following the initial value combined with plaintext message data to generated ciphertext message data which is in turn applied to yet another XOR hardware module 516 to be logically combined with feedback data generated by Galois Field (GF) multiplier hardware module 512 (e.g., initially GF multiplied additional authenticated data or other seed or initialization data) and the resultant logically combined data is applied to GF multiplier hardware module 512 as shown. In one embodiment of the present invention, GF multiplier comprises a $2^{128}$ bit unit. Following GF multiplication, the generated output of GF multiplier hardware module 512 is fed back to XOR hardware module 516 and simultaneously applied to another XOR hardware module 518. The applied GF multiplier hardware module output is logically combined using XOR hardware module 518 with the previously-described first encrypted IV/counter data to generate data specifying a "GCM MAC" as shown.

To generate data specifying a CCM MAC, a portion of the operational cycles available within pipelined block cipher encryption hardware module 502 other than those used to generate ciphertext message data as previously described are utilized such that little additional hardware is needed. More specifically, data specifying the first encrypted IV/counter is similarly provided via multiplexer 508 as indicated by dashed line 520 for use in the generation of a CCM/CBC MAC. Multiplexer 508 is then switched or actuated such that data specifying subsequent encrypted IV/counter values and plaintext message data are combined to generate ciphertext message data as shown.

The described plaintext message data is also simultaneously applied to another XOR hardware module 522 to be logically combined with feedback data generated by pipelined block cipher encryption hardware module 502 and the resultant logically combined data is applied to pipelined block cipher encryption hardware module 502 as shown. Following encryption, the generated output of pipelined block cipher encryption hardware module 502 is fed back to XOR hardware module 522 and simultaneously applied to another XOR hardware module 524. The applied block cipher encryption hardware module output is logically combined using XOR hardware module 524 with the previously-described first encrypted IV/counter data to generate data specifying a "CCM MAC" as shown.

Figure 6:
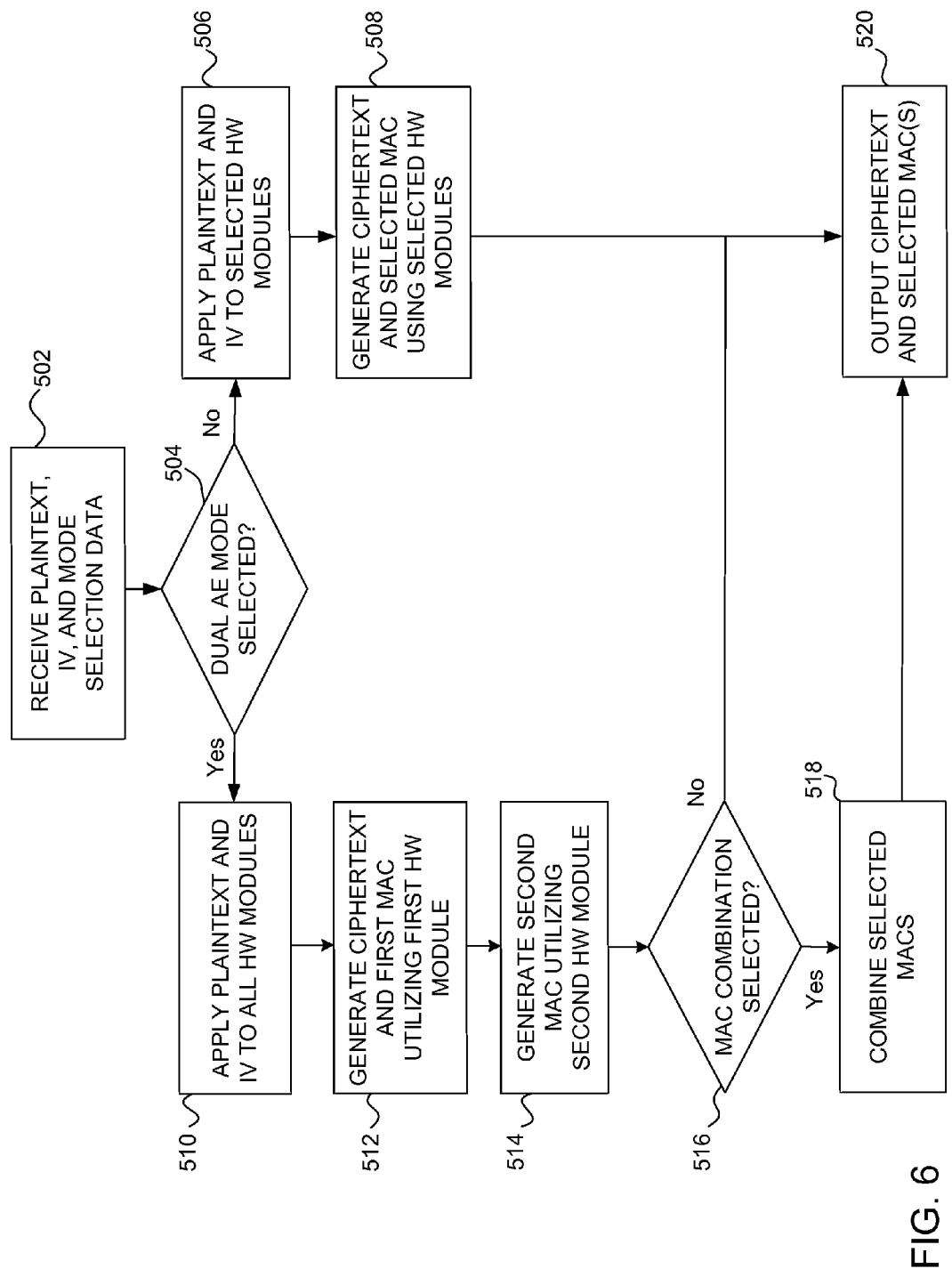
FIG. 6 illustrates a flow diagram of process to generate ciphertext and message authentication codes utilizing shared hardware according to an embodiment of the present invention.

FIG. 6 illustrates a flow diagram of process to generate ciphertext and message authentication codes utilizing shared hardware according to an embodiment of the present invention. In the illustrated process embodiment, plaintext message data, an initialization vector (IV) or other nonce, and authenticated encryption mode selection data is initially received (process block 602). Thereafter, a determination is made whether simultaneous dual authenticated encryption operational mode has been selected (process block 604) utilizing, for example, the received authenticated encryption mode selection data. If a dual AE mode is not specified (i.e., if received authenticated encryption mode selection data specifies that a selected one of a number of AE operational modes is to be utilized), the received plaintext message data and initialization vector is applied to selected hardware modules within an associated authenticated encryption unit (process block 606). Once applied, the described plaintext message data, initialization vector data, and selected hardware modules are utilized to generate ciphertext message data and selected authenticated encryption MAC(s) as shown (process block 608).

If a determination is made by contrast that a dual authenticated encryption operational mode has been selected, the received plaintext message data and initialization vector data is applied to the inputs of each hardware module in a corresponding authenticated encryption unit configured to receive such input data (process block 610). Thereafter in the illustrated embodiment, ciphertext message data and a first authenticated encryption MAC are generated utilizing a first hardware module associated with the described authenticated encryption unit (process block 612) while a second authenticated encryption MAC is generated utilizing another (second) associated hardware module (process block 614).

Once the described ciphertext message data and MACs have been generated, a determination is made (e.g., utilizing the received AE mode selection data) whether an additional layer of authentication is to be provided via a combination of two or more of the previously-generated authenticated encryption MACs (process block 616). Such combination may be performed using any of a number of techniques (e.g., concatenation, interleaving, or the like) in alternative embodiments of the present invention. Following the described determination, two or more selected MACs are combined (process block 618) in response to a determination that MAC combination has been selected. Otherwise, or following the generation of ciphertext message data and MAC(s) using selected hardware modules (process block 608), the generated ciphertext message data and selected MAC(s) are provided as output of an associated authenticated encryption unit (process block 620).

Although the flow diagram depicted in FIG. 6 indicate a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, addition process operations may be added where necessary in alternative embodiments of the present invention.

The present invention has been described in the context of fully functional data processing system; however, those skilled in the art will appreciate that the present invention is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects. For example, while CCM and GCM authenticated encryption modes of operation have been described herein exclusively, in alternative embodiments various combinations of GCM, CCM, EAX, OMAC, OCB, or the like may be provided. Consequently, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A method of generating ciphertext message data and message authentication codes utilizing shared authenticated encryption unit hardware, said method comprising:
   receiving plaintext message data at an authenticated encryption unit, wherein said authenticated encryption unit comprises a first authenticated encryption hardware module and a second authenticated encryption hardware module;
   generating a first message authentication code associated with a first authenticated encryption mode of operation utilizing said plaintext message data and said first authenticated encryption hardware module;
   receiving authenticated encryption mode selection data wherein the authenticated encryption mode selection data indicates selection of a dual mode, a dual mode comprising a mode in which two or more message authentication codes are generated substantially simultaneously; and
   generating ciphertext message data and a second message authentication code associated with a second authenticated encryption mode of operation utilizing said plaintext message data and said second authenticated encryption hardware module;
   wherein generating said first message authentication code and generating said ciphertext and said second message authentication code are performed substantially simultaneously.

2. The method of claim 1, wherein said method further comprises receiving authenticated encryption mode selection data,
   said first message authentication code is generated in response to a determination that said authenticated encryption mode selection data indicates said first authenticated encryption mode of operation, and
   said second message authentication code is generated in response to a determination that said authenticated encryption mode selection data indicates said second authenticated encryption mode of operation.

3. The method of claim 1, said method further comprising:
   receiving authenticated encryption mode selection data;
   providing a selected message authentication code of said first message authentication code and said second message authentication code at an output of said authenticated encryption unit in response to a receipt of said authenticated encryption mode selection data.

4. The method of claim 1, said method further comprising:
   generating a third message authentication code utilizing said first message authentication code and said second message authentication code.

5. The method of claim 4, wherein
   generating said third message authentication code comprises concatenating said first message authentication code and said second message authentication code.

6. The method of claim 1, wherein generating said ciphertext message data comprises performing a counter mode block cipher operation.

7. The method of claim 1, wherein said first authenticated encryption mode of operation comprises Galois/Counter Mode and said second authenticated encryption mode of operation comprises Counter with Cipher-Block Chaining Message Authentication Code Mode.

8. A machine-readable medium having a plurality of instructions executable by a machine embodied therein, wherein said plurality of instructions when executed cause said machine to perform a method of generating ciphertext message data and message authentication codes utilizing shared authenticated encryption unit hardware, said method comprising:

receiving plaintext message data at an authenticated encryption unit, wherein said authenticated encryption unit comprises a first authenticated encryption hardware module and a second authenticated encryption hardware module;

generating a first message authentication code associated with a first authenticated encryption mode of operation utilizing said plaintext message data and said first authenticated encryption hardware module;

receiving authenticated encryption mode selection data wherein the authenticated encryption mode selection data indicates selection of a dual mode, a dual mode comprising a mode in which two or more message authentication codes are generated substantially simultaneously; and generating ciphertext message data and a second message authentication code associated with a second authenticated encryption mode of operation utilizing said plaintext message data and said second authenticated encryption hardware module;

wherein generating said first message authentication code and generating said ciphertext and said second message authentication code are performed substantially simultaneously.

9. The machine-readable medium of claim 8, wherein
said method further comprises receiving authenticated encryption mode selection data,
said first message authentication code is generated in response to a determination that said authenticated encryption mode selection data indicates said first authenticated encryption mode of operation, and
said second message authentication code is generated in response to a determination that said authenticated encryption mode selection data indicates said second authenticated encryption mode of operation.

10. The machine-readable medium of claim 8, said method further comprising:
receiving authenticated encryption mode selection data;
providing a selected message authentication code of said first message authentication code and said second message authentication code at an output of said authenticated encryption unit in response to a receipt of said authenticated encryption mode selection data.

11. The machine-readable medium of claim 8, said method further comprising:
generating a third message authentication code utilizing said first message authentication code and said second message authentication code.

12. The machine-readable medium of claim 11, wherein
generating said third message authentication code comprises concatenating said first message authentication code and said second message authentication code.

13. The machine-readable medium of claim 8, wherein generating said ciphertext message data comprises performing a counter mode block cipher operation.

14. The machine-readable medium of claim 8, wherein said first authenticated encryption mode of operation comprises Galois/Counter Mode and said second authenticated encryption mode of operation comprises Counter with Cipher-Block Chaining Message Authentication Code Mode.

15. An apparatus for generating ciphertext message data and message authentication codes comprising:
means for receiving plaintext message data at an authenticated encryption unit, wherein said authenticated encryption unit comprises a first authenticated encryption hardware module and a second authenticated encryption hardware module;
means for generating a first message authentication code associated with a first authenticated encryption mode of operation utilizing said plaintext message data and said first authenticated encryption hardware module;
means for receiving authenticated encryption mode selection data wherein the authenticated encryption mode selection data indicates selection of a dual mode, a dual mode comprising a mode in which two or more message authentication codes are generated substantially simultaneously; and
means for generating ciphertext message data and a second message authentication code associated with a second authenticated encryption mode of operation utilizing said plaintext message data and said second authenticated encryption hardware module;
wherein said first message authentication code and said ciphertext and said second message authentication code are generated substantially simultaneously.

16. The apparatus of claim 15, wherein
said apparatus further comprises means for receiving authenticated encryption mode selection data,
said first message authentication code is generated in response to a determination that said authenticated encryption mode selection data indicates said first authenticated encryption mode of operation, and
said second message authentication code is generated in response to a determination that said authenticated encryption mode selection data indicates said second authenticated encryption mode of operation.

17. The apparatus of claim 15, further comprising:
means for receiving authenticated encryption mode selection data;
means for providing a selected message authentication code of said first message authentication code and said second message authentication code at an output of said authenticated encryption unit in response to a receipt of said authenticated encryption mode selection data.

18. The apparatus of claim 15, further comprising:
means for generating a third message authentication code utilizing said first message authentication code and said second message authentication code.

19. The apparatus of claim 18, wherein
said means for generating said third message authentication code comprises means for concatenating said first message authentication code and said second message authentication code.

20. The apparatus of claim 15, wherein said means for generating said ciphertext message data comprises means for performing a counter mode block cipher operation.

21. The apparatus of claim 15, wherein said first authenticated encryption mode of operation comprises Galois/Counter Mode and said second authenticated encryption mode of operation comprises Counter with Cipher-Block Chaining Message Authentication Code Mode.

22. An authenticated encryption unit for generating ciphertext message data and message authentication codes comprising:
a first input to receive plaintext message data;
a first authenticated encryption hardware module to generate a first message authentication code associated with a first authenticated encryption mode of operation utilizing said plaintext message data;
a second input to receive authenticated encryption mode selection data wherein the authenticated encryption mode selection data indicates selection of a dual mode, a dual mode comprising a mode in which two or more message authentication codes are generated substantially simultaneously; and a second authenticated encryption hardware module to generate ciphertext message data and a second message authentication code associated with a second authenticated encryption mode of operation utilizing said plaintext message data;

wherein said first message authentication code and said ciphertext and said second message authentication code are generated substantially simultaneously.

23. The authenticated encryption unit of claim 22, wherein said authentication encryption unit further comprises a second input to receive authenticated encryption mode selection data, said first message authentication code is generated in response to a determination that said authenticated encryption mode selection data indicates said first authenticated encryption mode of operation, and said second message authentication code is generated in response to a determination that said authenticated encryption mode selection data indicates said second authenticated encryption mode of operation.

24. The authenticated encryption unit of claim 22, further comprising:

a second input to receive authenticated encryption mode selection data, and an output to provide a selected message authentication code of said first message authentication code and said second message authentication code in response to a receipt of said authenticated encryption mode selection data.

25. The authenticated encryption unit of claim 22, further comprising:

a third authenticated encryption hardware module to generate a third message authentication code utilizing said first message authentication code and said second message authentication code.

26. The authenticated encryption unit of claim 25, wherein said third message authentication code is generated by concatenating said first message authentication code and said second message authentication code.

27. The authenticated encryption unit of claim 22, wherein said second authenticated encryption hardware module comprises a counter mode block cipher module.

28. The authenticated encryption unit of claim 22, wherein said first authenticated encryption mode of operation comprises Galois/Counter Mode and said second authenticated encryption mode of operation comprises Counter with Cipher-Block Chaining Message Authentication Code Mode.

* * * * *